(12) United States Patent
Jenkins

(10) Patent No.: US 11,645,429 B2
(45) Date of Patent: May 9, 2023

(54) ENCRYPTING TOUCH SCREEN

(71) Applicant: Diebold Nixdorf, Incorporated, North Canton, OH (US)

(72) Inventor: Randall W. Jenkins, Orrville, OH (US)

(73) Assignee: Diebold Nixdorf, Incorporated, Hudson, OH (US)

( * ) Notice: Subject to any disclaimer, the term of this patent is extended or adjusted under 35 U.S.C. 154(b) by 256 days.

(21) Appl. No.: 16/921,448

(22) Filed: Jul. 6, 2020

(65) Prior Publication Data
US 2022/0004669 A1   Jan. 6, 2022

(51) Int. Cl.
| | |
|---|---|
| H04L 29/06 | (2006.01) |
| G06F 21/83 | (2013.01) |
| G06F 21/31 | (2013.01) |
| H04W 4/80 | (2018.01) |
| H04L 9/32 | (2006.01) |
| G06F 3/04883 | (2022.01) |
| H04L 9/08 | (2006.01) |

(52) U.S. Cl.
CPC .......... *G06F 21/83* (2013.01); *G06F 3/04883* (2013.01); *G06F 21/31* (2013.01); *H04L 9/0825* (2013.01); *H04L 9/3247* (2013.01); *H04W 4/80* (2018.02)

(58) Field of Classification Search
CPC ...... G06F 21/83; G06F 3/04883; G06F 21/31; H04W 4/80; H04L 9/0825; H04L 9/3247
See application file for complete search history.

(56) References Cited

U.S. PATENT DOCUMENTS

| | | | |
|---|---|---|---|
| 6,549,194 B1* | 4/2003 | McIntyre | G07F 7/1041 340/5.4 |
| 8,922,498 B2 | 12/2014 | Vesely et al. | |
| 9,280,234 B1 | 3/2016 | Froment et al. | |
| 10,019,107 B2 | 7/2018 | Baldwin | |
| 2003/0210127 A1* | 11/2003 | Anderson | G06F 21/36 340/5.27 |
| 2011/0025610 A1* | 2/2011 | Whytock | G06F 3/04886 345/173 |

(Continued)

FOREIGN PATENT DOCUMENTS

| | | | |
|---|---|---|---|
| CN | 105005733 A | * 10/2015 | ............. G06F 21/35 |
| CN | 214752118 U | * 11/2021 | |

(Continued)

OTHER PUBLICATIONS

De Luca, Alexander, et al. "Touch me once and i know it's you! implicit authentication based on touch screen patterns." proceedings of the SIGCHI Conference on Human Factors in Computing Systems. 2012. (Year: 2012).*

(Continued)

*Primary Examiner* — Shawnchoy Rahman
(74) *Attorney, Agent, or Firm* — Black, McCuskey, Souers & Arbaugh, LPA

(57) ABSTRACT

In accordance with an example embodiment there is disclosed herein a method for authenticating a touch screen layout. A file containing the touch screen layout is signed by a key known to the device that is to deploy the touch screen layout, such as, for example an automated banking machine and/or a point of sale system. Before the touch screen is used by the device's user interface, the device validates the touch screen.

17 Claims, 9 Drawing Sheets

(56) References Cited

U.S. PATENT DOCUMENTS

| | | | |
|---|---|---|---|
| 2016/0092877 A1* | 3/2016 | Chew ................. | G06Q 20/4012 |
| | | | 705/72 |
| 2017/0185980 A1* | 6/2017 | Wurmfeld ............. | G07F 19/202 |
| 2018/0329492 A1 | 11/2018 | Coppin et al. | |
| 2018/0374392 A1* | 12/2018 | Ollivier ................. | G07F 7/1041 |
| 2021/0073759 A1* | 3/2021 | Wurmfeld .......... | G06Q 20/1085 |

FOREIGN PATENT DOCUMENTS

| | | |
|---|---|---|
| EP | 324306 A3 | 5/1990 |
| JP | 04260914 A | 9/1992 |

OTHER PUBLICATIONS

English Translation of JP04260914A.

\* cited by examiner

ENCRYPTING TOUCH SCREEN

TECHNICAL FIELD

The present disclosure relates generally to touch screen displays.

BACKGROUND

Touch screen displays are increasing in popularity because they eliminate the need for a separate keyboard which can save space and money. Encrypting touch screens encrypt the touch coordinates, preventing unauthorized parties from obtaining the data entered on the touch screen.

SUMMARY OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment there is disclosed herein a method for authenticating a touch screen layout. A file containing the touch screen layout is signed by a key known to the device that is to deploy the touch screen layout, such as, for example an automated banking machine and/or a point of sale system. Before the touch screen is used by the device's user interface, the device validates the touch screen.

In accordance with an example embodiment, there is disclosed herein a technique for parallax correction for a touch screen. The technique includes a method that comprises determining an amount of parallax for an electronically generated visual image on a display surface that passes through and airgap between the display and a touch screen medium and the touch screen medium, where the touch screen medium is prone to causing apparent image displacement. The parallax correction is determined for a maximum predetermined angle relative to the display surface. A mechanical tolerance is determined between the display and the touch screen medium. A worst case variation based on the amount of parallax and mechanical tolerance is determined. A touch area that is adjacent to at least a portion of the perimeter of the visually generated electronic image extending a distance from the portion of the perimeter of the visually generated electronic image corresponding to the worst case variation is assigned where a touch input is considered the same as touching where the electronically generated electronic image is displayed. In response to detecting a touch input in the assigned area that is adjacent to the at least a portion of the perimeter of the visually generated electronic image corresponding to the worst case variation, a signal is generated by a circuit coupled with the touch screen medium indicating that the visually generated electronic image was touched.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
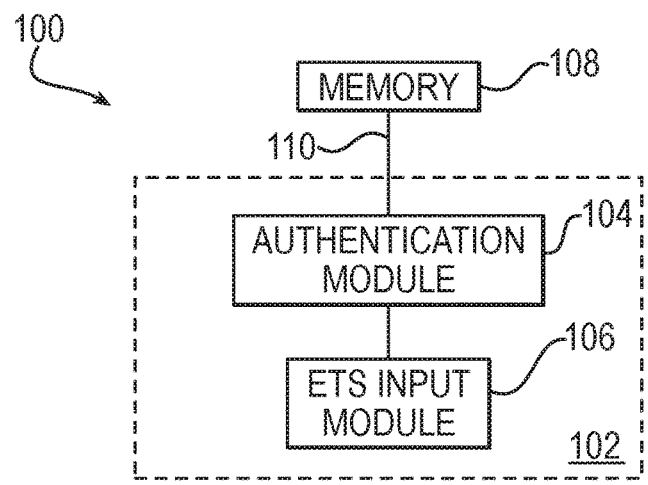
FIG. 1 is a block diagram illustrating a device with an encrypting touch screen module operable to authenticate a touch screen layout in accordance with an example embodiment.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

There are example embodiments described herein that are directed to Encrypted Touch Screen (ETS) screen layouts, e.g., how to design, sign, load and generate screen content for the encrypting touch screen. The layout may be signed with a key associated with the manufacturer of the device (e.g., manufacturer of an automated banking machine or point of sale device) key (such as for example Diebold Nixdorf, the applicant of this application) key, a key associated with the manufacturer of the ETS (e.g., Cryptera), or a key associated with the customer (e.g., the owner or lessee of the device).

A designer of a touch screen layout is responsible for ensuring the touch screen layout comports with the associated display screen that will be output at the time the touch screen layout is employed. When the touch screen layout file is downloaded to the ETS module, the ETS module authenticates the touch screen layout file. In an example embodiment, the touch screen layout file is downloaded from the device's controller via a Universal Serial Bus (USB) connection. The touch screen layout file can be signed with any suitable key (e.g., symmetric or asymmetric key) as long as the ETS has a corresponding key.

In an example embodiment, the display and touch screen layout files are stored in a controller, e.g., an automated teller machine (ATM) controller, coupled with the display module and the ETS module. An ATM controller may forward the files as needed. For example, for a personal identification number (PIN) entry the ATM controller forwards the display file to the display module and the touch screen layout file to the ETS module which authenticates the display. In particular embodiments, the display controller can also authenticate the display file.

In other embodiments, once the touch screen layout file is authenticated it is stored in a secure memory associated with the ETS module. This can obviate the need to authenticate the touch screen layout file every time the file is employed. When he controller requests an input that employs the touch screen layout file, the controller can send data identifying the touch screen layout file.

FIG. 1 is a block diagram illustrating a device 100 with an encrypting touch screen (ETS) module 102 operable to authenticate a touch screen layout in accordance with an example embodiment. In the illustrated example, the ETS module 102 comprises an authentication module 104 and an ETS input module 106. Although the authentication module 104 and ETS input module 106 are illustrated as separate modules, those skilled in the art should readily appreciate that this is a logical view merely selected for ease of illustration, and that the functionality of the authentication module and ETS input module 106 can be implemented by employing a single processor executing computer readable instructions, or a single circuit. In an example embodiment, the functionality of the ETS module 102, including but not limited to the authentication module 104 and ETS module 106 are implemented in logic. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

In an example embodiment, a touch screen layout file, containing data representative of a touch screen layout, is obtained from memory 108. The touch screen layout file may be conveyed to the touch screen module 102 by a communication connection 110. The communication connection 110 may be any suitable wired or wireless media. In an example embodiment, the communication connection 110 is a USB.

In an example embodiment, the ETS module 102 receives a request to load a touch screen layout. For example, the request can be from an ATM controller or a POS controller. The touch screen module 102 obtains the touch screen layout file (or data representative of the touch screen layout) from the memory 108. The authentication module 104 authenticates the touch screen data file. The touch screen data file can be authenticated by using any suitable technique, such as, for example a message authentication check (MAC) or message integrity check (MIC). For example, the touch screen layout file can be signed using a key (asymmetric or symmetric) that is associated with the authentication module 104. In particular embodiments, the touch screen layout file is encrypted by either a symmetric or asymmetric key, and the authentication module 104 employs the corresponding key to decrypt the touch screen layout file. If the touch screen layout file is successfully authenticated, the data representative of the touch screen layout in the touch screen layout file is loaded into the ETS input module 106. The ETS input module 106 employs the touch screen layout for handling touch screen inputs. For example, the touch screen layout can be employed for receiving a PIN. If the touch screen layout file can not be authenticated by authentication module 104, the touch screen layout file is discarded.

As will be described in more detail herein infra, in an example embodiment where the touch screen module 102 has a memory (not shown, see e.g., ref.218 in FIG. 2), the touch screen layout can be stored in the memory for future use. In particular embodiments the memory is a secure memory. For a subsequent use, the touch screen layout is loaded from the memory, eliminating the need to authenticate the file for subsequent uses.

As will be described in more detail herein infra, in an example embodiment, the data representative of a display screen layout associated with the touch screen layout can also be encrypted. The data representative of the display screen layout is authenticated by logic associated with the display employing a key that is associated with the logic associated with the display, which in an example embodiment is a different key than is used for authenticating the touch screen layout although it is also possible to use the same key for authenticating the touch screen layout and the screen layout. Upon successfully authenticating the display screen layout, the display screen.

Figure 2:
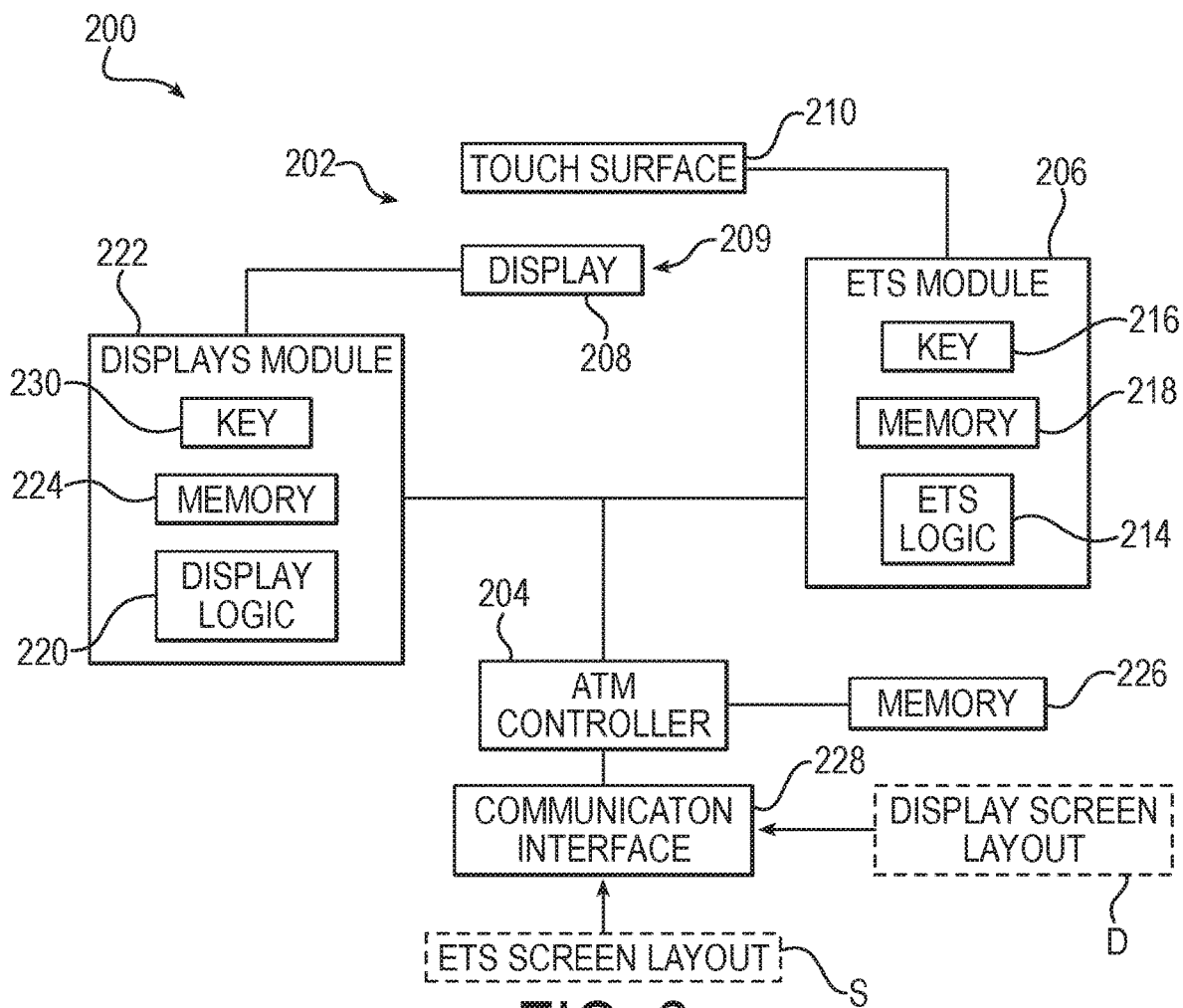
FIG. 2 is a block diagram illustrating an example of a user interface and controller of an automated banking machine with an encrypting touch screen module operable to authenticate a touch screen layout in accordance with an example embodiment.

FIG. 2 is a block diagram illustrating an example of a user interface 202 and controller 204 of an automated banking machine 200 with an encrypting touch screen module 206 operable to authenticate a touch screen layout in accordance with an example embodiment.

The user interface 202 comprises a display 208 with a touch surface 210 that overlies the display 208. The touch surface 210 is operable to receive touch inputs from a person interacting with the user interface 202.

The touch surface is coupled with ETS module 206. The ETS module 206 comprises ETS logic 214 which is operable to perform the functionality described herein. In an example embodiment, the EGS logic 214 is operable to perform both the function of an authentication module (see e.g., authentication module 104 in FIG. 1) and an ETS input module (see e.g., ETS input module 106 in FIG. 1). The ETS logic 214 employs key 216 for authenticating ETS screen layouts.

In an example embodiment, an ETS screen layout (or data representative of a screen layout) S is received by the ATM controller 204 via a communication interface 228. Although the example illustrated in FIG. 2 employs an ATM controller, those skilled in the art can readily appreciate that the principles described herein may apply to other types of devices and controllers, such as a POS with a touch screen. The ATM controller 204 comprises logic for performing the functionality described herein. The communication interface 228 can be any suitable wired or wireless interface. In an example embodiment, the communication interface 228 is secured. For example, the communication interface 228 can be a USB interface that is in a physically locked compartment to prevent unauthorized access. As another example, communication interface 228 can employ encryption to prevent communications with any device (e.g., a device connected via a wire or a wireless device employing a wireless protocol such as WIFI or BLUETOOTH) that does not have the appropriate key.

In an example embodiment, the ATM controller 204 stores the ETS screen layout in memory 226. When the ATM controller 204 is performing a function that requires the use of the ETS layout S (for example a PIN input), the ATM controller 204 has the screen layout S forwarded to the ETS module 206. The ETS logic 214 employs key 216 to validate the ETS layout S. ETS logic 214 can use any suitable protocol for authenticating ETS screen layout S, including but not limited to, authenticating a MAC or MIC, or decrypting the file containing the touch screen layout with a predefined (symmetric or asymmetric) key. Upon successfully authenticating the ETS screen layout S, the ETS logic 214 employs the screen layout S for touch inputs received by touch surface 210.

In an example embodiment, the ETS module 206 further comprises a memory 218. In particular embodiments the memory is secured (e.g., protected from tampering, see for example U.S. Pat. No. 10,078,764 which is hereby incorporated by reference herein). In an example embodiment, the ETS logic 214 upon successfully authenticating the ETS screen layout S, stores the authenticated ETS screen layout S in memory 218. For subsequent uses of the screen, the ATM controller 204 can specify the ETS module 206 employs the previously authenticated ETS Screen Layout S, which the ETS logic 214 can retrieve from memory 218 without needing to again authenticate the ETS screen layout S. In an example embodiment, the key 216 is stored in memory 218.

The user interface 202 further comprises a display 208 that comprises a display surface 209 that is operable to display electronically generated visual images. The display 208 is coupled to a display module 222. The display module 222 employs display logic 220 for obtaining data to display from the ATM controller 204.

In an example embodiment, the display module 222 is operable to authenticate data to be displayed, such as screen layouts. This can prevent a hacker from trying to obtain personal identification (e.g., name and/or social security number) of a user by requesting the user input it on the screen. The display logic 220 employs a key 230 for authenticating display screens. For example, display screens can be uploaded similar to how the ETS screen layout S, display screens can be uploaded to the ATM controller 204 via communication interface 228.

In an example embodiment, the ATM controller 204 stores the display screen layout D in memory 226. When the ATM controller 204 is performing a function that requires the use of the display layout (for example "Enter PIN:"), the ATM controller 204 has the display screen layout D forwarded to the display module 222. The display logic 220 employs key 230 to validate the display layout. Display logic 220 can use any suitable protocol for authenticating display screen layout D, including but not limited to, authenticating a MAC or MIC, or decrypting the file containing the touch screen layout with a predefined (symmetric or asymmetric) key. Upon successfully authenticating the display screen layout D, the display logic 220 employs the display screen layout D for output on display 208.

In an example embodiment, the display module 222 further comprises a memory 224. In particular embodiments the memory is secured. In an example embodiment, the display logic 220 upon successfully authenticating the display screen layout D, stores the authenticated display screen layout D in memory 224. For subsequent uses of the screen, the ATM controller 204 can specify the display module 222 employs the previously authenticated display screen layout D, which the display logic 220 can retrieve from memory 224 without needing to again authenticate the display screen layout D. In an example embodiment, the key 230 is stored in memory 224. In an example embodiment, keys 216, 230 are different, however, in another example embodiment keys 216, 230 can be the same.

Figure 3:
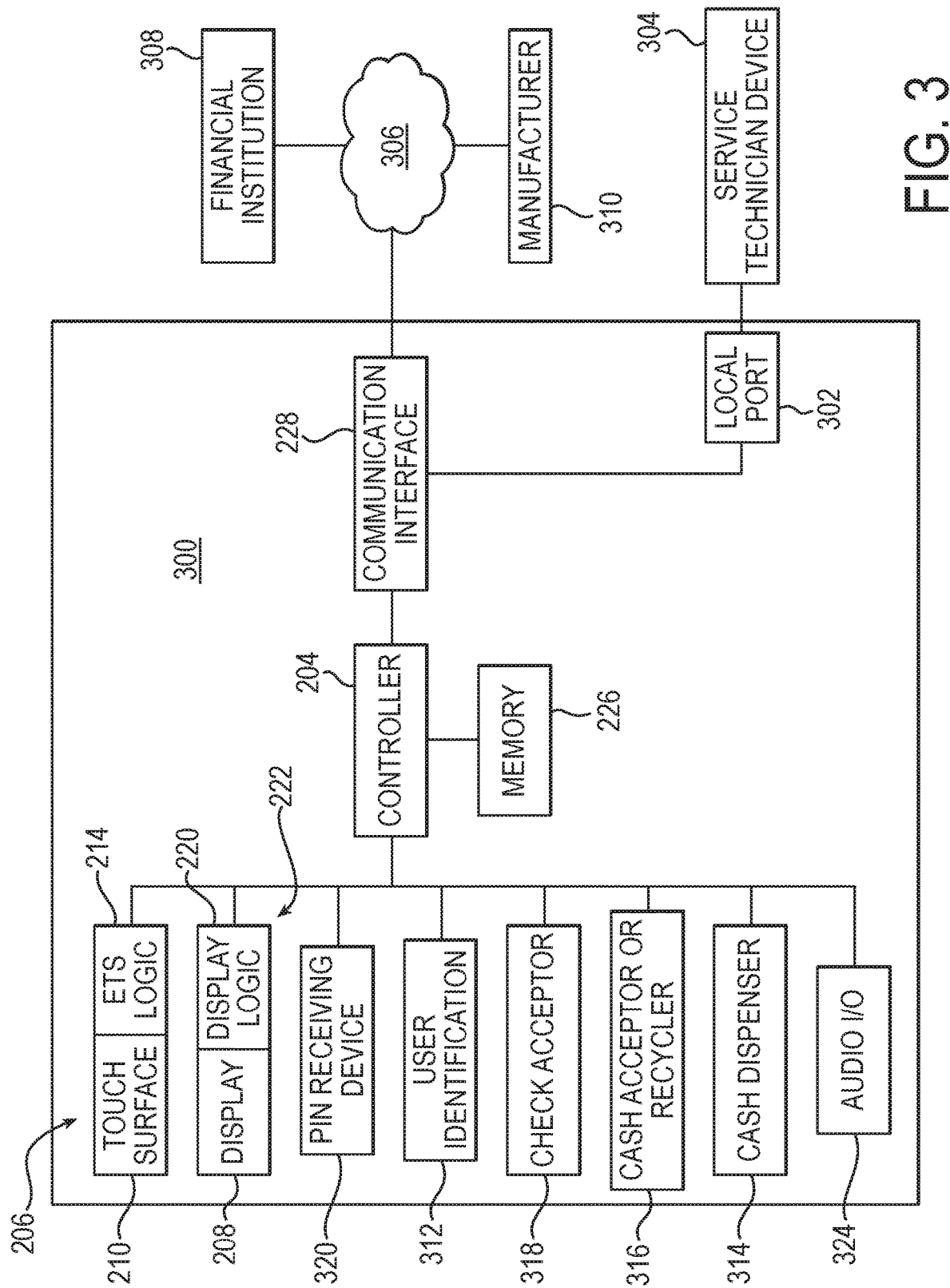
FIG. 3 is a block diagram of an automated banking machine with an encrypting touch screen module operable to authenticate a touch screen layout in accordance with an example embodiment.

FIG. 3 is a block diagram of an automated banking machine 300, such as an automated teller machine (ATM) with an encrypting touch screen module 206 operable to authenticate a touch screen layout in accordance with an example embodiment. The touch screen module 206 comprises a touch surface 210, and ETS logic 214. The ETS logic 214 is coupled with a controller 204. The controller 204 is coupled with a memory 226 a communication interface 228, and display logic 220 of display module 222 that comprises a display 208. The controller 204 is operable to obtain data representative of an input from the touch screen logic 214 and provide data representative of an output to the display logic 220.

In an example embodiment, the communication interface 208 is coupled with a local port 302. The local port 302 can be any suitable wired or wireless interface. For example, the local port 302 can be a USB port and/or a Near Field Communication (NFC) interface.

In an example embodiment, the local port 302 is located within a secure compartment within the automated banking machine where access is limited to approved individuals such as service technicians. A service technician can a service technician device 304 to communicate with the local port 302. In an example embodiment, the service technician uses the local port to upload data representative of touch screen and/or screen layouts to controller 204. In an example embodiment, the controller is operable to store the data representative of the touch screen layout and/or display screen layout in memory 226. The controller 204 is operable to forward data representative of a touch screen received via the local port 302 to the ETS logic 214. The ETS logic 204 is operable to authenticate the data representative of the touch screen using any suitable technique, such as the techniques described herein. In particular embodiments, the controller 204 is operable to forward data representative of a display screen layout is received via the local port 302 to the display logic 220. The display logic 220 is operable to authenticate the data representative of the display screen layout using any suitable technique, such as the techniques described herein.

In an example embodiment, the communication interface 228 is coupled with a network 306. Network 306 can allow automated banking machine to communicate with a financial institution device 308. The financial institution device 308 can be employed to approve financial transactions conducted on automated banking machine 300. In particular embodiments, network 306 can be coupled with a manufacturer's device 310. In an example embodiment, updated, including touch screen layouts and/or screen layouts, to the automated banking machine 300 can be performed by either the financial institution device 308 and/or the manufacturer device 310 via the communication interface 228. In an example embodiment, the controller 204 is operable to store the data representative of the touch screen layout and/or display screen layout in memory 226. The controller 204 is operable to forward data representative of a touch screen received via the communication interface 208 to the ETS logic 214. The ETS logic 204 is operable to authenticate the data representative of the touch screen using any suitable technique, such as the techniques described herein. In particular embodiments, the controller 204 is operable to forward data representative of a display screen layouts received via the communication interface 228 to the display logic 220. The display logic 220 is operable to authenticate the data representative of the display screen layout using any suitable technique, such as the techniques described herein.

In an example embodiment, the automated banking machine 300 further comprises a PIN receiving device 320, such as for example, a PIN pad, encrypting PIN PAD (EPP), and/or a keypad that is separate from the touch screen. The PIN pad and/or keypad can be employed as an alternative method for a user to input data.

In another example embodiment, the automated banking machine 300 further comprises a user identification device 312. The user identification device 312 can be any device operable to obtain data representative of a user. Examples of user identification devices 312 include but are not limited to card readers, encrypted card readers, biometric devices or wireless devices such as a NFC interface. In particular embodiments, the automated banking machine 300 may suitably comprise a plurality of user identification devices 312.

In yet another example embodiment, the automated banking machine 300 further comprises a check acceptor 318. This can allow the automated banking machine 300 to receive checks or other documents that are a form of payment, such as money orders, for deposit.

In still yet another example embodiment, the automated banking machine 300 further comprises a cash acceptor or recycler 316. A cash acceptor will allow users to deposit cash into the automated banking machine 300. A cash acceptor can not only accept cash deposits but can dispense the cash that was deposited for cash withdrawals.

In another example embodiment, the automated banking machine 300 further comprises a cash dispenser 314. The cash dispenser 314 is employed for dispensing cash for cash withdrawal transactions.

In yet another example embodiment, the automated banking machine 300 further comprises an audio input/output (I/O) device 324. The audio input/output device 314 can aid handicapper users in conducting transactions with the automated banking machine 300.

In still yet another example embodiment, the automated banking machine 300 further comprises a combination of two or more of a group consisting of a PIN receiving device (e.g., a PIN PAD, EPP and/or keyboard) 320, user identification device 312, check acceptor 318, cash acceptor or recycler 316, and audio input/output device 324.

To illustrate by way of example the automated banking machine 300 can be employed for making a cash withdrawal transaction. The user requesting the withdrawal is identified via the user identification device 312. For example, the user may insert a magnetic stripe card into the user identification device 312, employ a wireless device such as a mobile phone and wirelessly connect to the user identification device 312. The controller 204 causes a display screen layout to be output on display 208 requesting the user to authenticate themselves, for example by entering a PIN into the touch screen 206 or by entering a PIN into the PIN receiving device (e.g., a PIN PAD, EPP, or keypad) 320. The screen layout is authenticated by display logic 220 before the layout is output. The controller 204 causes data representative of a touch screen layout to be provided to the touch screen 206. The ETS logic 220 authenticate the data representative of the touch screen layout before employing the touch screen layout to receive inputs that are representative of the PIN.

Upon successfully authenticating the user, the controller 204 causes a data representative of one or more display screen layouts for requesting transaction details such as which user account and the amount of the withdrawal forwarded to the display 208. The display logic 220 authenticates the one or more display screen layouts for requesting transaction details such as which user account and the amount prior to outputting the one or more display screen layouts on the display 208. The controller 204 also causes data representative of one or more touch screen layouts corresponding to the one or more display screen layouts to be forwarded to the touch screen module 206 for receiving user inputs. The ETS logic 214 authenticates the one or more touch screen layouts corresponding to the one or more display screen layouts before employing the one or more touch screen layouts for receiving user inputs.

Upon obtaining the transaction data, the controller 204 can communicate via the communication interface 228 and network 306 with the financial institution 308 to obtain authorization to dispense the cash. Upon receiving authorization, the controller 204 causes the cash dispenser 314 to dispense the requested funds. The controller 204 can also cause an output to be displayed on display 208 indicating to the user the cash is available at the dispenser.

Those skilled in the art can readily appreciate the controller 204 can employ the display 208 and touch screen module 206 for conducting other types of transactions. For example, for check deposits the controller can provide displays indicating when to deposit checks into a check acceptor 318, display detected amounts, and receive confirmation of the amounts of the checks being deposited. As another example, a cash recycler 316 can be employed instead of a cash dispenser 314. Thus, the controller 204 can accept cash deposits via the cash recycler 316 and output on the display 208 the amount of the deposit and request an input via the touch screen module 206. The display screens and touch screen inputs employed for these types of transactions may also be authenticated as described herein.

Figure 4:
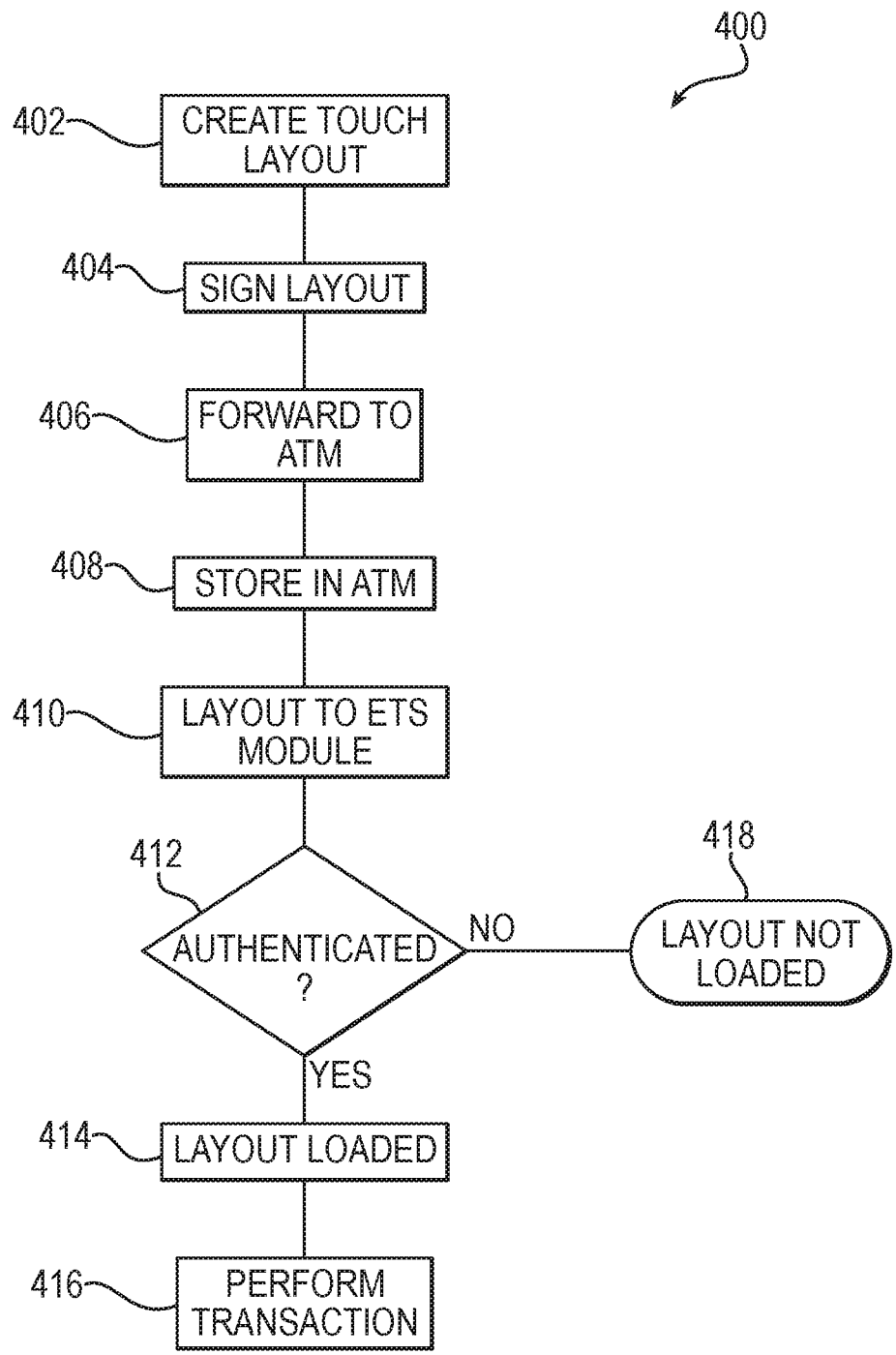
FIG. 4 is a block diagram illustrating a method for employing an authenticated touch screen layout in accordance with an example embodiment.
Figure 5:
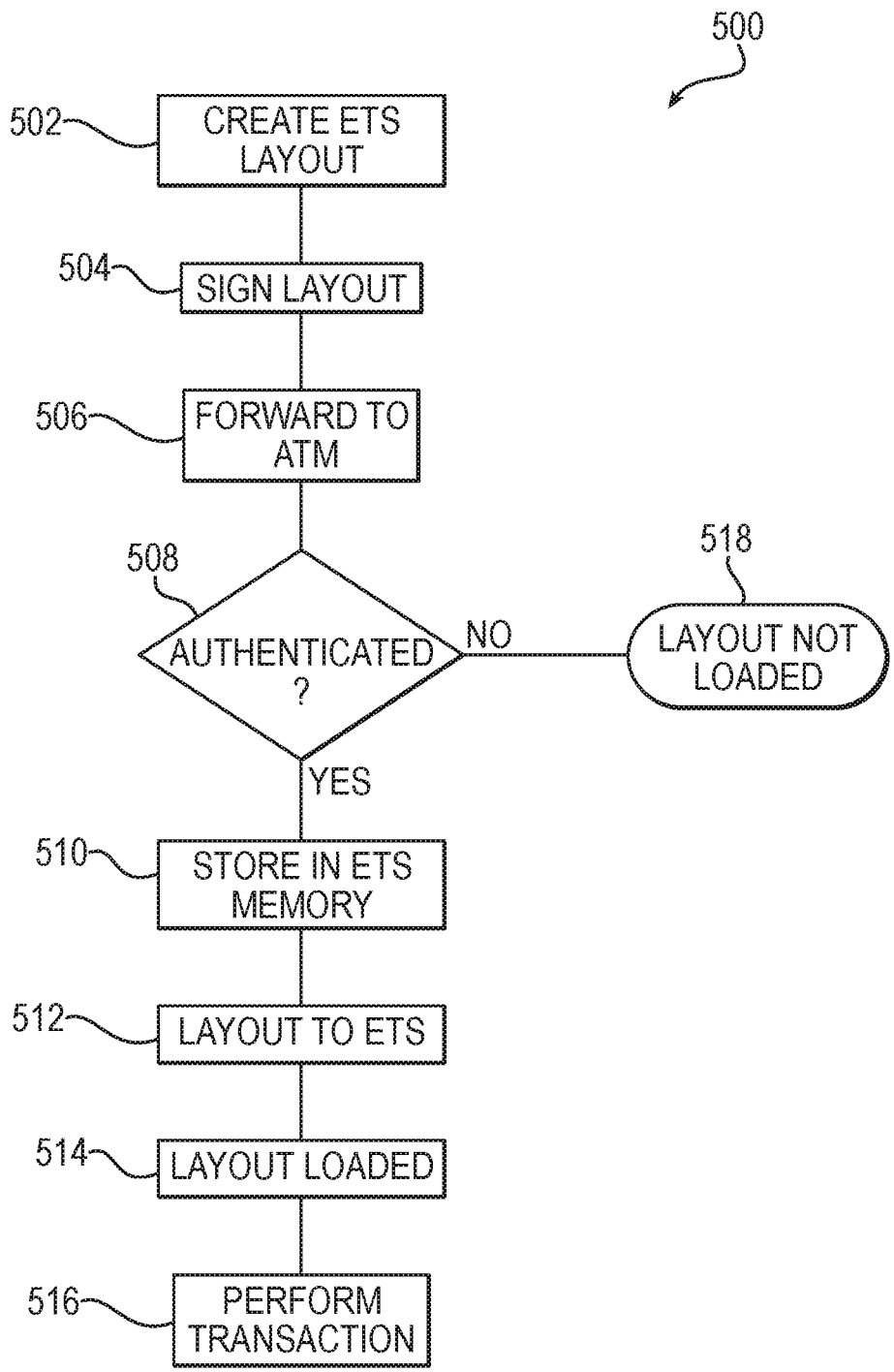
FIG. 5 is block diagram illustrating a method for employing a touch screen layout where the layout is stored in a secure memory after the touch screen layout is authenticated.

In view of the foregoing structural and functional features described above, methodologies 400, 500 in accordance with example embodiments will be better appreciated with reference to FIGS. 4 and 5 respectively. While, for purposes of simplicity of explanation, the methodologies 400, 500 of FIGS. 4 and 5 are shown and described as executing serially, it is to be understood and appreciated that the example embodiments are not limited by the illustrated orders, as some acts could occur in different orders and/or concurrently with other acts from that shown and described herein. Moreover, not all illustrated features may be required to implement the methodologies 400, 500. The methodologies described herein is suitably adapted to be implemented in hardware, software when executed by a processor, or a combination thereof.

FIG. 4 is a block diagram illustrating a method 400 for employing an authenticated touch screen layout in accordance with an example embodiment. The methodology 400 can be implemented by the ETS input module 106 and authentication module 104 in FIG. 1, ETS logic 214 in FIG. 2 or 3, and/or processor _ in FIG. _.

At 402, a touch screen layout is created. The person creating the touch screen layout would be responsible for ensuring that the coordinates for the touch inputs align with the corresponding display screen layout.

At 404, data representative of the touch screen layout is signed or encrypted. For example, the layout a Message Authentication Code (MAC) or Message Integrity Code (MIC) can be employed for signing the touch screen layout. In an example embodiment, the data representative of the touch screen layout is encrypted. The signature or encryption can employ a key known to the machine that will be employing the touch screen layout. The key can be a symmetric or asymmetric key.

At 406, the signed or encrypted data representative of the touch screen layout is sent to the device that will employ the touch screen layout. In this example, an automated banking machine such as an Automated Teller Machine (ATM).

At 408, the data representative of the touch screen layout is stored at the destination device. For example, the signed or encrypted data representative of the touch screen layout can be stored in a memory associated with an ATM's controller.

At 410, the signed or encrypted data representative of the touch screen layout is send to an encrypted touch screen (ETS) module. For example, during a transaction being conducted at an ATM, when the ATM controller is at a point in a transaction where the touch screen layout is to be employed, the ATM controller forwards to the signed or encrypted data representative of the touch screen layout to the ETS module.

At 412, the ETS module attempts to authenticate the signed or encrypted data representative of the touch screen layout. If the data representative of the touch screen layout is signed, the ETS module authenticates the signature, such as a MAC or MIC. If the data representative of the touch screen layout is encrypted, the ETS module decrypts the data representative of the touch screen layout, and optionally may further verify the data representative of the touch screen layout is correct by verifying a checksum.

If the data representative of the touch screen layout is authenticated (YES), at 414, the touch screen layout based on the data representative of the touch screen layout is loaded by the ETS module. The ETS module employs the touch screen layout for interpreting touch inputs (e.g., touch coordinates) received at the touch screen.

At 416, the transaction is performed. Touch inputs received are interpreted by the ETS module employing the touch screen layout derived from the authenticated data representative of the touch screen layout.

If, at 412, the data representative of the touch screen layout cannot be authenticated (NO), as indicated at 418 the touch screen layout is not loaded. This prevents unauthorized layouts, such as layouts from unknow sources, from being employed by the ATM for financial transactions.

As those skilled in the art can readily appreciate, a similar method can be employed for authenticating display screens. The display screen layout can be authenticated by the display module instead of the ETS module, however, in an example embodiment, the display module can employ the ETS module to authenticate a display screen layout.

FIG. 5 is block diagram illustrating a method 500 for employing a touch screen layout where the layout is stored in a secure memory after the touch screen layout is authenticated. The methodology 500 can be implemented with the ETS input module 106 and authentication module 104 in FIG. 1, ETS logic 214 in FIG. 2 or 3, and/or processor _ in FIG. _.

At 502, a touch screen layout is created. The person creating the touch screen layout would be responsible for ensuring that the coordinates for the touch inputs align with the corresponding display screen layout.

At 504, data representative of the touch screen layout is signed or encrypted. For example, the layout a Message Authentication Code (MAC) or Message Integrity Code (MIC) can be employed for signing the touch screen layout. In an example embodiment, the data representative of the touch screen layout is encrypted. The signature or encryption can employ a key known to the machine that will be employing the touch screen layout. The key can be a symmetric or asymmetric key.

At 506, the signed or encrypted data representative of the touch screen layout is sent to the device that will employ the touch screen layout. In this example, an automated banking machine such as an Automated Teller Machine (ATM).

In this example embodiment, the ETS module has a secure memory that can store touch screen layout data. Thus, when the ATM controller receives the data representative of the touch screen layout the controller automatically forwards the data representative of the touch screen layout to the ETS module before employing the touch screen layout. At 508, the ETS module attempts to authenticate the signed or encrypted data representative of the touch screen layout. If the data representative of the touch screen layout is signed, the ETS module authenticates the signature, such as a MAC or MIC. If the data representative of the touch screen layout is encrypted, the ETS module decrypts the data representative of the touch screen layout, and optionally may further verify the data representative of the touch screen layout is correct by verifying a checksum.

If the data representative of the touch screen layout is authenticated (YES), at 510, the data representative of the touch screen layout is stored in the memory of the ETS module. Because the touch screen layout has already been authenticated and is stored in a secured memory, the touch screen layout does not have to be authenticated again when it is time to employ the touch screen layout.

At 512, the signed or encrypted data representative of the touch screen layout is send to an encrypted touch screen (ETS) module. For example, during a transaction being conducted at an ATM, when the ATM controller is at a point in a transaction where the touch screen layout is to be employed, the ATM controller forwards to the signed or encrypted data representative of the touch screen layout to the ETS module.

Since the data representative of the touch screen layout has already been authenticated, at 514, the touch screen layout based on the data representative of the touch screen layout is automatically loaded by the ETS module. The ETS module employs the touch screen layout for interpreting touch inputs (e.g., touch coordinates) received at the touch screen.

At 516, the transaction is performed. Touch inputs received are interpreted by the ETS module employing the touch screen layout derived from the authenticated data representative of the touch screen layout.

If, at 508, the data representative of the touch screen layout cannot be authenticated (NO), as indicated at 518 the touch screen layout is not loaded. This prevents unauthorized layouts, such as layouts from unknow sources, from being employed by the ATM for financial transactions.

As those skilled in the art can readily appreciate, a similar method can be employed for authenticating display screens. The display screen layout can be authenticated by the display module instead of the ETS module, however, in an example embodiment, the display module can employ the ETS module to authenticate a display screen layout.

Figure 6:
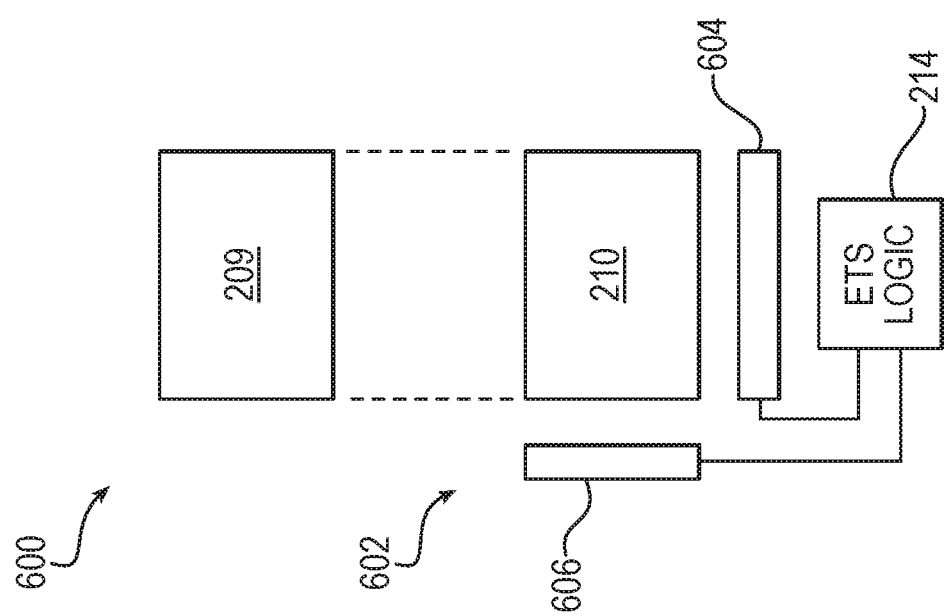
FIG. 6 is a block diagram illustrating an example of an exploded view of the display surface and touch screen.

FIG. 6 is a block diagram illustrating an example of an exploded view 600 of the display surface 209 and touch screen surface 210 that overlies the display surface 209. The display 208 can be any suitable type of device for outputting electronically generated visual images, such as Cathode Ray Tube (CRT), Liquid Crystal Display (LCD), or Light Emitting Diode (LED). The touch screen assembly 602 includes a X-Y matrix which responds to touching by generating output signals into sensors 604 and 606. The sensors 604 and 606 are coupled to ETS logic 214. Touch detection can be by any of capacitive or inductive sensors, contact switches, pressure sensors, optical sensors and the like. The ETS logic 214 can correlate the detected touch coordinates with electronically generated visual images on the display surface 214. As will be described in further detail herein, the ETS logic 214 compensates for parallax error and correlates touch coordinates within a predefined distance of at least a portion of the perimeter of an electronically generated visual image with the electronically generated visual image.

Figure 7:
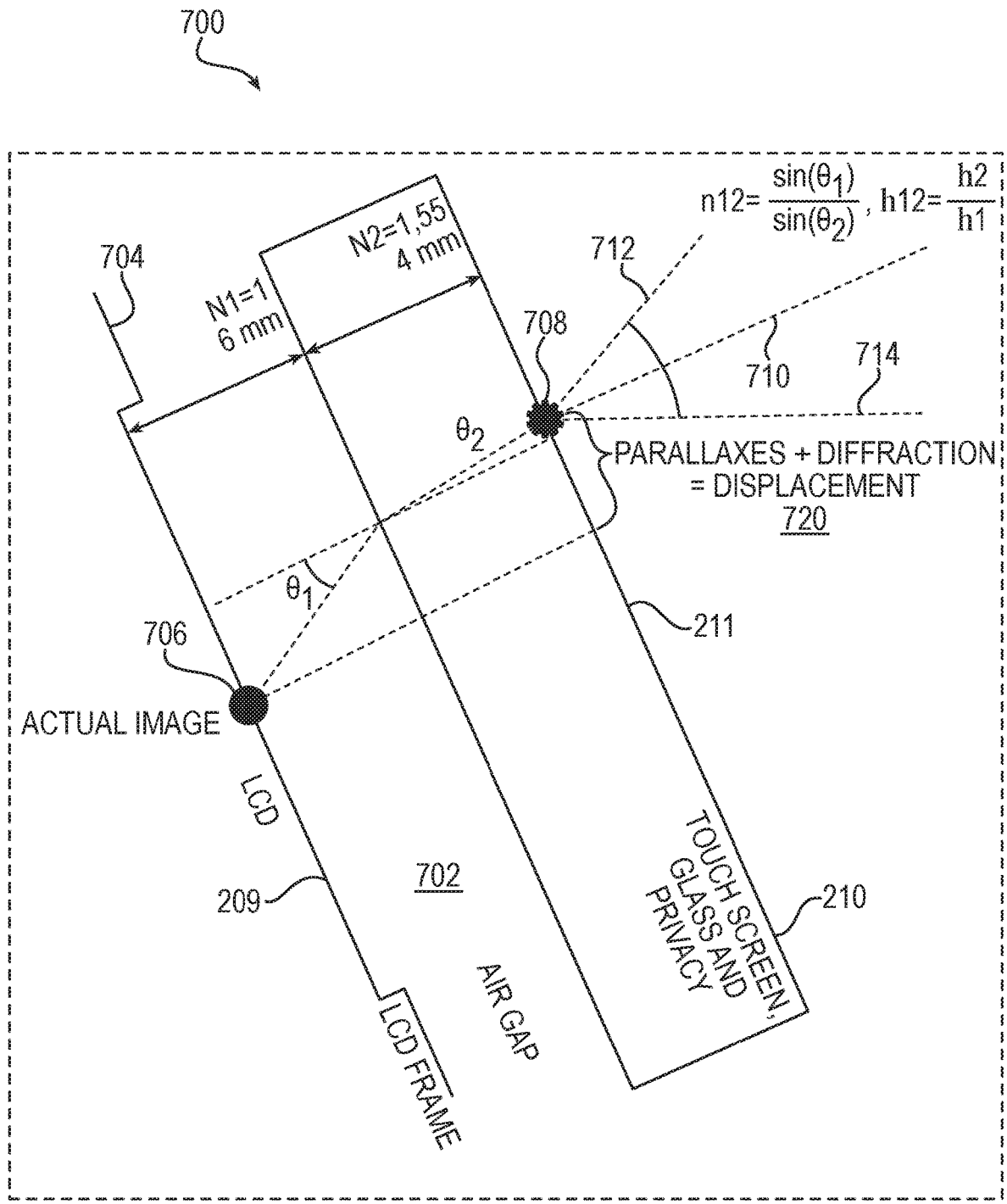
FIG. 7 is a block diagram illustrating an example of an exploded side view of the display surface and touch screen.

FIG. 7 is a block diagram illustrating an example of an exploded side view 700 of the display surface 209 and touch screen 209. An air gap 702 exits between the display surface 209 and the touch screen 209. In the illustrated example, the air gap is 6 mm and the thickness of the touch screen 210 is 4 mm. Note that these numbers were selected merely for ease of illustration and the principles described herein are not limited to any specific size and/or configuration. A frame 704 is employed to hold the display surface in place.

For purposes of illustration a pixel is located on the display surface 209 at a first location 706. Light from the pixel at location 706 passes through air gap 702 and reaches the touch screen surface 210 at an angle of incidence, $\Theta_1$. Upon reaching the touch screen 210, the light from pixel 706 is refracted at an angle of refraction $\Theta_2$. The angle of refraction, $\Theta_2$, depends on the type of medium employed for the touch screen 210. For example, the touch screen 210 can be constructed of glass or any suitable transparent material. After passing through the touch screen medium, the pixel appears at location 708. A normal to the touch surface 210 is illustrated by line 710. A maximum viewing angle above the normal is illustrated by line 712 and a minimum viewing angle below the normal is illustrated by line 714. The displacement of the pixel between locations 706 and 708 is the sum of the displacement caused by parallax and diffraction. The displacement is represented by 720.

In an example embodiment, the mechanical tolerance between the display surface 209 and the touch screen 210 is determined. The mechanical tolerance is employed to determine a worst case variation (or displacement) for an electronically generated visual image (e.g., a pixel, a button, an alphanumeric character, icon, etc.) at the surface 211 of the touch screen 210. As will be described herein, a touch area that is adjacent to at least a portion of the perimeter of the visually generated electronic image is assigned where a touch input in the assigned area is considered the same as a touch input where the electronically generated visual image is displayed. The distance of the assigned area from the perimeter (or a portion of the perimeter) is based on the determined worst case variation (or displacement). Thus, when a touch input is detected, for example by sensors 604 and 606 in FIG. 6, the ETS logic 214 (not shown, see e.g., FIGS. 2, 3, and/or 6) will treat the touch input the same as if the touch input was received in the area of the electronically generated visual image to compensate for parallax, refraction, and mechanical tolerances as described herein, and generate a signal indicating the electronically generated visual icon was touched.

In an example embodiment, the maximum viewing angle from the normal represented by line 712 and the minimum viewing angle from the normal represented by line 714 may be at different angles from the normal, represented by line 710. Therefore, the assigned area above perimeter of the electronically generated visual image may be different than the assigned area below the perimeter of the electronically generated visual image (higher and lower). In particular embodiments, the maximum parallax is employed for the assigned area around the entire perimeter.

Figure 8:
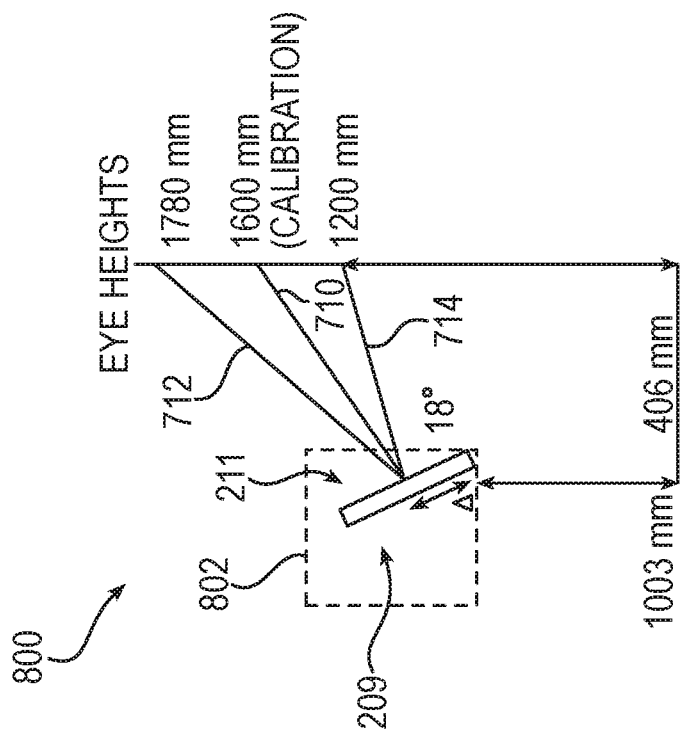
FIG. 8 illustrates an example configuration for a touch screen in an automated banking machine.

FIG. 8 illustrates an example configuration 211 or a touch screen in an automated banking machine. This example represents a type of touch screen configuration employed by an automated banking machine and is being used merely for ease of illustration. In the illustrated example, the display surface 209 and touch screen surface 211 are tilted at an angle of eighteen degrees from the vertical plane. The bottom of the assembly with the display surface 209 and touch screen surface 211 is one-thousand and three millimeters above a horizontal surface. The parallax calculations involve a person standing four hundred and six millimeters from the display surface 209 with a maximum height of one-thousand seven-hundred and eight millimeters above the surface for calculating the maximum viewing angle and a height of one-thousand two-hundred millimeters for calculating the minimum viewing angle. The normal from the touch screen surface 211 would intersect a person standing four hundred and six millimeters away from the display surface 209 at one-thousand and six-hundred millimeters above the surface.

For example, the parallax and refraction error of a known touch screen for a user standing four hundred millimeters from a display 209 at a height of one thousand and one hundred millimeters with a six millimeter air gap and the touch screen medium (e.g., glass) is four millimeters is 4.58 mm at an eye height of 1740 mm and is −5.50 mm for a 1200 mm eye height. The mechanical tolerance between the display and the touch screen is +/−2.45 mm worst case, 0.85 RMS (Root-Mean-Square). The worst case variation between the display surface 209 and the touch screen surface 211 is +7.03 mm, −7.96 mm.

As another example, the parallax and refraction error of a known touch screen for a user standing four hundred millimeters from a display 209 at a height of one thousand millimeters with a 7.5 millimeter air gap and the touch screen medium (e.g., glass) is five millimeters is +7.02 mm at an eye height of 1740 mm and is −2.72 mm for a 1200 mm eye height. The mechanical tolerance between the display and the touch screen is +/−2.45 mm worst case, 0.85 RMS (Root-Mean-Square). The worst case variation between the display surface 209 and the touch screen surface 211 is +9.47 mm, −5.17 mm.

Figure 9:
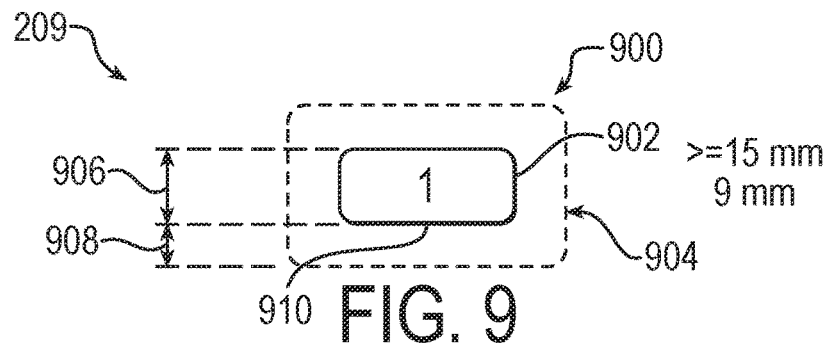
FIG. 9 illustrates an example of an electronically generated visual image and parallax correction on a touch screen surface.

FIG. 9 illustrates an example 900 of an electronically generated visual image (a button) 902 and an assigned area adjacent to the electronically generated visual image on a touch screen surface. In the illustrated example, the electronically generated visual image 902 is a button with the number 1 inside. The button has a height 906 of 15 mm to comport with global usability requirements. An area 904 is assigned with a distance 908 of 9 mm from the perimeter 910 of the electronically generated visual image 902 to compensate for parallax, refraction, and mechanical tolerance. Any touch inputs detected within area 904 are handled the same as touch inputs detected over the electronically generated visual image 902.

Figure 10:
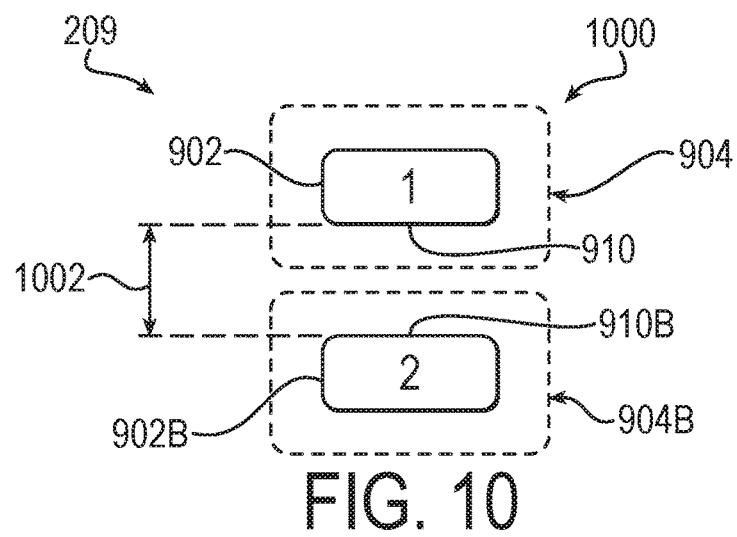
FIG. 10 illustrates an example of two electronically generated visual images and parallax corrections on a touch screen surface.
Figure 11:
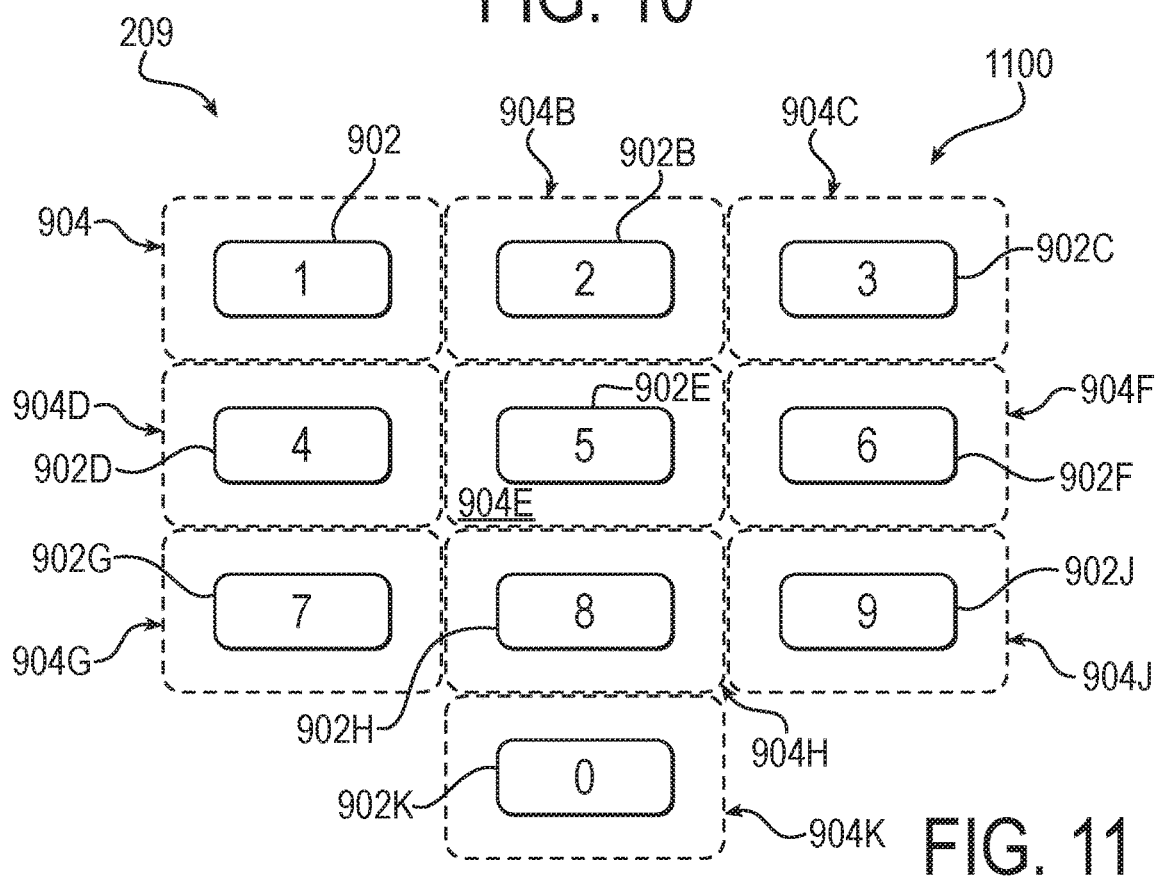
FIG. 11 illustrates an example of a plurality of electronically generated visual images and parallax corrections on a touch screen surface.

FIG. 10 illustrates an example 1000 of two electronically generated visual images 902 and 902B that are bounded by assigned areas 904 and 904B respectively for parallax, refraction, and mechanical tolerance compensation on a touch surface (e.g., touch surface 211 shown and described herein). The minimum distance 1002 between the electronically generated visual images 902 and 902B displayed on display surface 209 (FIG. 2) by display logic 220 (FIG. 2) is the sum of the distances (see e.g., distance 908 in FIG. 9) of the assigned areas 904, 904B from the perimeters 910, 910B respectively. For example, assuming the same measurements from the previous example in FIG. 9, the minimum distance 1002 between the electronically generated visual images 902 and 902B is eighteen millimeters FIG. 11 illustrates an example of a plurality of electronically generated visual images (or buttons) 902, 902B, 902C, 902D, 902E, 902F, 902G, 902H, 902J, and 902K and parallax corrections on a touch screen surface (e.g., touch surface 211 shown and described herein). Each of the electronically generated visual images 902, 902B, 902C, 902D, 902E, 902F, 902G, 902H, 902J, and 902K have an assigned touch area 904, 904B, 904C, 904D, 904E, 904F, 904G, 904H, 904J, and 904K respectively based on the worst case variation (or displacement). As illustrated in FIG. 11, the minimum distance between any two buttons on display surface 209 (FIG. 2) by display logic 220 (FIG. 2) is the sum of the distance between the perimeter of the button and the distance the assigned area extends from the button. Using the previously described example in FIG. 9, the minimum spacing between any two buttons 902-902K is 18 mm. Any touches detected in assigned touch areas 904, 904B, 904C, 904D, 904E, 904F, 904G, 904H, 904J, and 904K will be correlated with the corresponding button 02, 902B, 902C, 902D, 902E, 902F, 902G, 902H, 902J, and 902K respectively. Although the examples illustrated in FIGS. 9-11 employ a button with a numeric character, those skilled in the art can readily appreciate that the content of the bottoms 02, 902B, 902C, 902D, 902E, 902F, 902G, 902H, 902J, and 902K can be any alphanumeric character, icon, or any other visual indicia.

Figure 12:
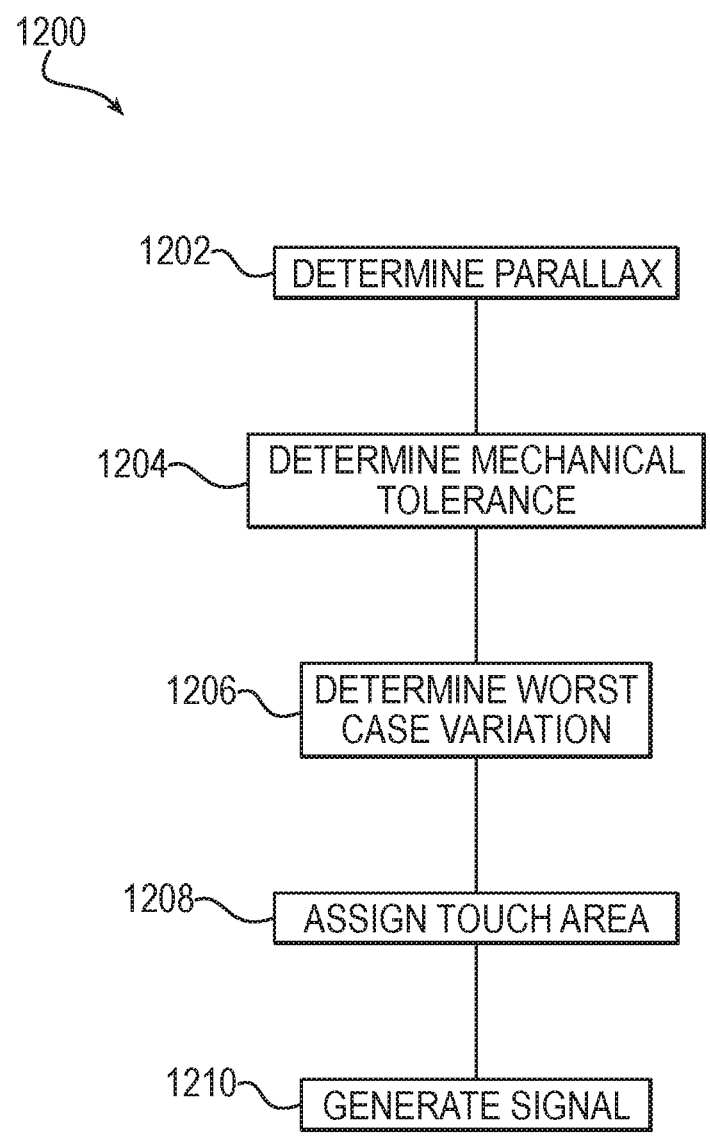
FIG. 12 illustrates a method for compensating for touch screen parallax.

In view of the foregoing structural and functional features described above in FIGS. 6-11, a methodology 1200 in accordance with an example embodiment will be better appreciated with reference to FIG. 12. While, for purposes of simplicity of explanation, the methodology 1200 of FIG. 12 is shown and described as executing serially, it is to be understood and appreciated that the example embodiment is not limited by the illustrated order, as some acts could occur in different orders and/or concurrently with other acts from that shown and described herein. Moreover, not all illustrated features may be required to implement a methodology in accordance with an aspect of an example embodiment. The methodology 1200 described herein is suitably adapted to be implemented in hardware, software when executed by a processor, or a combination thereof. For example, methodology may be implemented by ETS logic 214 described in FIGS. 2, 3, and 6.

At 1202, an amount of parallax and refraction for an electronically generated visual image on a display surface that passes through and airgap between the display surface and a touch screen medium, and the touch screen medium is determined. For example, as illustrated in FIG. 7, an image (e.g., pixel) on display surface 209 passes through air gap 702 to touch screen medium 210 that further causes the image to be refracted. The amount of parallax and refraction are determined for a maximum viewing angle (e.g. represented by line 712 in FIG. 7) and a minimum angle (represented by line 714 in FIG. 7).

At 1204, a mechanical tolerance between the display surface (e.g., display surface 209) and the touch screen medium (e.g., touch screen 210) is determined. The mechanical tolerance can be based on machine tolerances, changes due to temperature changes, or any other physical phenomena that can cause a change in the distance between the display surface and the touch screen.

At 1206, a worst case variation (or displacement) based on the amount of parallax, refraction, and mechanical tolerance is determined. The worst case variation includes the amount of parallax that can be caused by mechanical tolerances. Examples of worst case variations are described in FIG. 8 herein.

At 1208, a touch area adjacent to at least a portion of the perimeter of the visually generated electronic image extending a distance from the portion of the perimeter of the visually generated electronic image corresponding to the worst case variation is assigned. A touch input detected in the assigned area is considered the same as touching where the electronically generated electronic image is displayed. See FIG. 9 for an example of an assigned area adjacent to the perimeter of an electronically generated visual image (e.g., a button).

At 1210, a signal is generated by a circuit (e.g., ETS logic 214) coupled with the touch screen medium in response to detecting a touch input in the assigned touch area adjacent to at least a portion of the perimeter of the visually generated electronic image. The signal indicating that the electronically generated visual image was touched. This compensates for any introduced by parallax, refraction, and/or mechanical tolerances. For example, the ETS logic 214 upon detecting from sensors 604, 606 that an input was received on the touch screen 210 at coordinates corresponding to the assigned touch area adjacent to an electronically generated visual image (e.g., button) for example as illustrated in FIG. 9, the ETS logic 214 will generate a signal indicating the button was touched.

In an example embodiment, wherein a second electronically generated image is displayed on the display having a second assigned touch area corresponding to a second worst case variation (or displacement) which may or may not be the same as the first worst case displacement. The display (e.g., display logic 220 described in FIGS. 2 and 3) is operable to display the first and second electronically generated visual images a minimum distance apart on the display surface that is twice the worst case variation.

In an example embodiment, a plurality of electronically generated images are displayed on the display. Each of the plurality of electronically generated images have an assigned touch area extending from the their perimeters based on worst case variation as determined herein. The minimum distance between any two of the plurality of electronically generated images on the display surface is twice the worst case variation. See FIG. 11 for an example.

Figure 13:
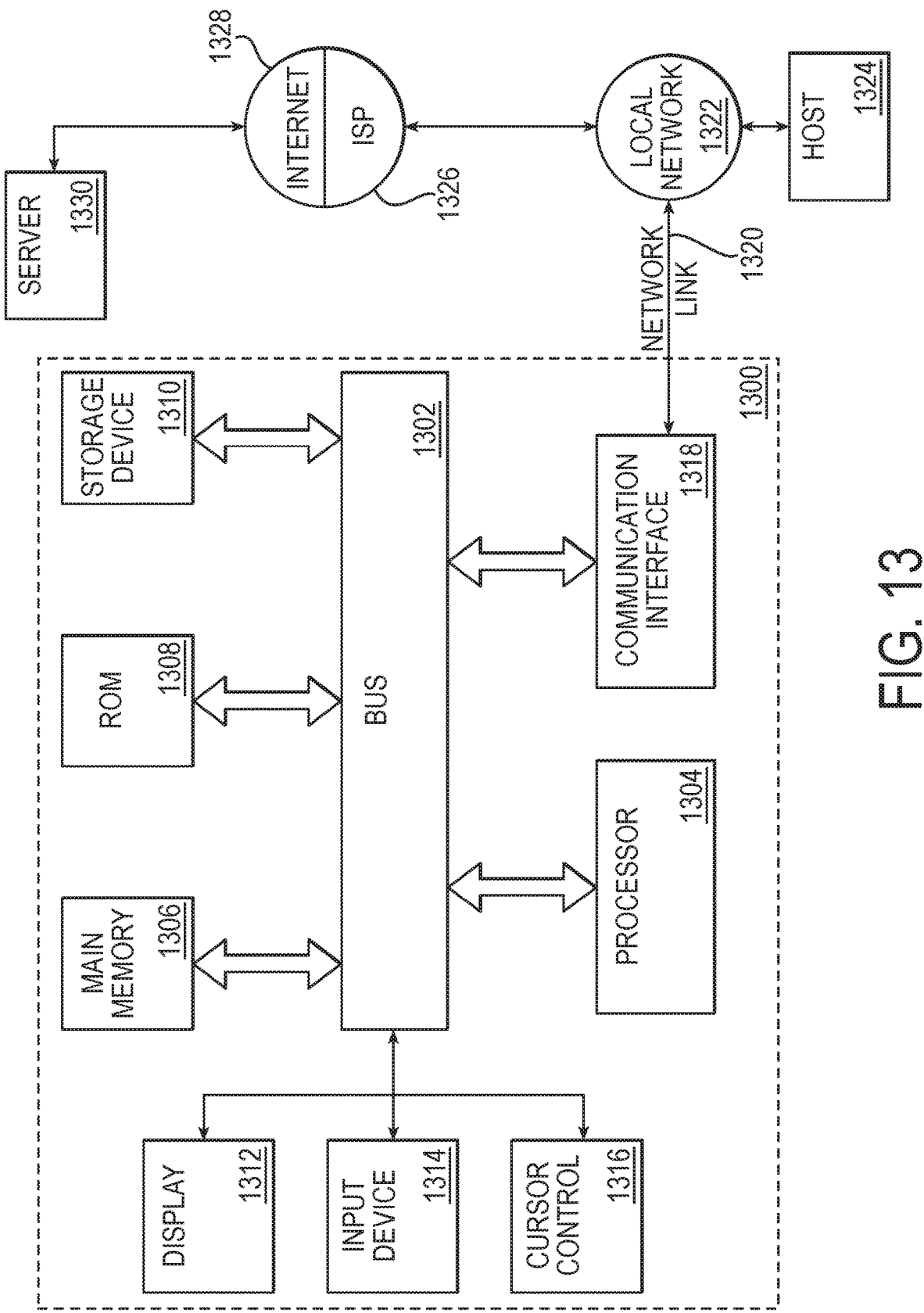
FIG. 13 is a block diagram illustrating an example of a computer system upon which an example embodiment can be implemented.

FIG. 13 is a block diagram that illustrates a computer system 1300 upon which an example embodiment may be implemented. The computer system 1300 can be employed to implement the authentication module 104 (FIG. 1), the ETS Input Module 106 (FIG. 1), the ATM controller 204 (FIGS. 2, 3), the ETS logic 214 (FIGS. 2, 3, 6), and the Display Logic 220 (FIGS. 2, 3). In example embodiments, the computer system 300 can be employed to implement methodology 400 (FIG. 4), methodology 500 (FIG. 5), and/or methodology 1200 in FIG. 12.

The computer system 1300 comprises a bus 1302 or other communication mechanism for communicating information and a processor 1304 coupled with bus 1302 for processing information. Computer system 1300 also includes a main memory 1306, such as random access memory (RAM) or other dynamic storage device coupled to bus 1302 for storing information and instructions to be executed by processor 1304. Main memory 1306 also may be used for storing a temporary variable or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk, optical disk, or solid state disk is provided and coupled to bus 1302 for storing information and instructions.

Computer system 1300 may be coupled via bus 1302 to a display 1312 such as a cathode ray tube (CRT) or liquid crystal display (LCD), for displaying information to a computer user. An input device 1314, such as a one or more touch sensor are coupled to bus 1302 for communicating information and command selections to processor 1304. This input device typically has two degrees of freedom in two axes, a first axis (e.g. x) and a second axis (e.g. y) that allows the device to specify positions in a plane.

An aspect of the example embodiment is related to the use of computer system 1300 for touch screen parallax. According to an example embodiment, touch screen parallax is provided by computer system 1300 in response to processor 1304 executing one or more sequences of one or more instructions contained in main memory 1306. Such instructions may be read into main memory 1306 from another computer-readable medium, such as storage device 1310. Execution of the sequence of instructions contained in main memory 1306 causes processor 1304 to perform the process steps described herein. One or more processors in a multi-processing arrangement may also be employed to execute the sequences of instructions contained in main memory 1306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1304 for execution. Such a medium may take many forms, including but not limited to non-volatile media. Common forms of computer-readable media include for example, hard disk, magnetic cards, paper tape, any other physical medium with patterns of holes, a RAM, a PROM, an EPROM, a FLASHPROM, CD, DVD, SSD or any other memory chip or cartridge, or any other medium from which a computer can read.

In some embodiments, the computer system 1300 also includes a communication interface 1318 coupled to bus 1302. Communication interface 1318 provides a two-way data communication coupling computer system 1300 to a network link 1320 that is connected to a local network 1322. For example, communication interface 1318 may be a local area network (LAN) card to provide a data communication connection to a compatible LAN. As another example, communication interface 1318 may be an integrated services digital network (ISDN) card or a modem to provide a data communication connection to a corresponding type of telephone line. Wireless links may also be implemented. In any such implementation, communication interface 1318 sends and receives electrical, electromagnetic, or optical signals that carry digital data streams representing various types of information.

The network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communications through the worldwide packet data communication network, now commonly referred to as the "Internet" 1328.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method, comprising:
receiving a request to load a touch screen layout that interprets touch inputs received on a touch surface to data representative of an input;
obtaining data representative of the touch screen layout by a touch screen module;
authenticating the data representative of the touch screen layout with a predetermined key;
loading the touch screen layout by the touch screen module responsive to successfully authenticating the data representative of the touch screen layout; and
interpreting a touch input received on the touch screen to data representative of an input responsive to successfully authenticating the data representative of the touch screen layout.

2. The method set forth in claim 1, the authenticating the touch screen layout comprises validating a signature associated with the touch screen layout where the predetermined key is associated with the touch screen module.

3. The method set forth in claim 2, wherein the predetermined key is an asymmetric key.

4. The method set forth in claim 1, further comprising:
storing the data representative of the touch screen layout in a memory associated with the touch screen module responsive to successfully authenticating the data representative of the touch screen layout; and
loading the data representative of the touch screen layout from the memory associated with the touch screen module responsive to receiving a subsequent request to load the touch screen layout.

5. The method set forth in claim 1, further comprising:
receiving a request to load a display screen layout;
obtaining data representative of the display screen layout by a display module associated with the touch screen module;
authenticating the data representative of the display screen layout by the display module;
loading the display screen layout by the display module responsive to successfully authenticating the data representative of the display screen layout.

6. A method, comprising:
receiving a request to load a touch screen layout;

obtaining data representative of the touch screen layout by a touch screen module;

authenticating the data representative of the touch screen layout;

loading the touch screen layout by the touch screen module responsive to successfully authenticating the data representative of the touch screen layout;

receiving a request to load a display screen layout;

obtaining data representative of the display screen layout by a display module associated with the touch screen module;

authenticating the data representative of the display screen layout by the display module; and loading the display screen layout by the display module responsive to successfully authenticating the data representative of the display screen layout;

wherein the display screen layout is signed by a first key and the touch screen layout is signed by a second key.

7. The method set forth in claim 6, wherein the first and second keys are the same.

8. An apparatus, comprising:

a touch surface;

a touch screen logic coupled with the touch surface;

a display;

a display logic coupled with the display;

a controller coupled with the touch screen logic and the display logic, wherein the controller is operable to obtain data representative of an input from the touch screen logic and provide data representative of an output to the display logic;

a memory coupled with the controller;

a communication interface coupled with the controller; and a cash dispenser coupled with the controller;

the controller is operable to receive via the communication interface data representative of a touch screen layout;

the controller is operable to forward the data representative of the touch screen layout to the touch screen logic;

the touch screen logic is operable to authenticate the data representative of the touch screen layout with a predetermined key;

the touch screen logic is operable to employ the touch screen layout to translate touch inputs received on the touch surface to data representative of an input responsive to successfully authenticating the touch screen layout;

the controller is operable to determine a request for a financial transaction requesting an amount of cash via the cash dispenser based on data representative of an input from the touch screen logic; and the controller is operable to cause the cash dispenser to dispense the amount of cash responsive to determining the request for the financial transaction requesting the amount of cash.

9. The apparatus set forth in claim 8, further comprising a user identification module.

10. The apparatus set forth in claim 9, wherein the user identification module comprises a card reader.

11. The apparatus set forth in claim 10, wherein the card reader is an encrypting card reader.

12. The apparatus set forth in claim 9, wherein the user identification module comprises a wireless transceiver.

13. The apparatus set forth in claim 12, wherein the wireless transceiver is a near field communication transceiver.

14. The apparatus set forth in claim 9, further comprising a personal identification number pad.

15. The apparatus set forth in claim 14, wherein the personal identification number pad is an encrypting personal identification number pad.

16. The apparatus set forth in claim 8, wherein the controller is operable to the controller store the data representative of a touch screen layout in the memory; and the controller is operable to forward the data representative of the touch screen layout to the touch screen logic from the memory.

17. The apparatus set forth in claim 8, further comprising:

the controller is operable to receive via the communication interface data representative of a display layout;

the controller is operable to forward the data representative of the touch screen layout to the display logic; and the display logic is operable to authenticate the data representative of the display screen layout with a second predetermined key; and the display screen logic is operable to employ the touch screen layout to translate touch inputs received on the touch surface to data representative of an input responsive to successfully authenticating the touch screen layout.

* * * * *